(12) United States Patent
Ghoshal (10) Patent No.: US 6,535,342 B1
(45) Date of Patent: Mar. 18, 2003

(54) APPARATUS, SYSTEM AND METHOD FOR WRITING INFORMATION ONTO MAGNETIC MEDIA FIELD OF THE INVENTION

(75) Inventor: Uttam Shyamalindu Ghoshal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,273

(22) Filed: Dec. 9, 1999

(51) Int. Cl.⁷ .................................................. G11B 5/10

(52) U.S. Cl. ........................................ 360/55; 360/122

(58) Field of Search ................................ 360/122, 126, 360/319, 324, 55

(56) References Cited

U.S. PATENT DOCUMENTS

| | | | | |
|---|---|---|---|---|
| 3,696,312 A | * | 10/1972 | Kuhn et al. | 324/300 |
| 4,405,961 A | * | 9/1983 | Chow et al. | 360/129 |
| 4,468,472 A | * | 8/1984 | Kashima et al. | 501/137 |
| 4,739,431 A | * | 4/1988 | Yasuda et al. | 360/126 |
| 5,448,422 A | * | 9/1995 | Hiramatsu | 360/59 |
| 5,755,986 A | * | 5/1998 | Yamamoto et al. | 252/62.54 |
| 5,867,990 A | | 2/1999 | Ghoshal | 62/3.7 |
| 5,936,813 A | * | 8/1999 | Kim et al. | 360/113 |
| 5,966,941 A | | 10/1999 | Ghoshal | 62/3.7 |
| 6,000,225 A | | 12/1999 | Ghoshal | 62/3.7 |
| 6,181,533 B1 | * | 1/2001 | Pokhil | 360/324 |

FOREIGN PATENT DOCUMENTS

| | | | |
|---|---|---|---|
| WO | PCT/GB98/03412 | 12/1999 | |
| WO | WO 00-08693 | 2/2000 | H01L/35/34 |

OTHER PUBLICATIONS

Rinzler, A.G. et al.; Large–Scale Purification of Single–Wall Carbon Nanotubes: Process, Product and Characterization; 1998; pp. 29–37.
Liu, Jie et al.; Fullerene Pipes; Science; vol. 280; May 22, 1998; pp. 1253–1255.
Thess, Andreas et al.; Crystalline Ropes of Metallic Carbon Nanotubes; Science; vol. 273; Jul. 26, 1996; pp. 483–487.
Tubes@ Rice; Rice University; http://cnst.rice.edu/tubes/;.
An Introduction to Thermoelectrics; http://www.tellurex.com/resource/introc.html.
Tellurex Corporaion Frequently Asked Questions; http://www.tellurex.com/resource/txfaqc.html.

* cited by examiner

*Primary Examiner*—David Hudspeth
*Assistant Examiner*—Varsha A. Kapadia
(74) *Attorney, Agent, or Firm*—Duke W. Yee; Casimer K. Salys; Michael R. Nichols

(57) ABSTRACT

A method of writing data onto magnetic thin film media commonly employed in magnetic disk drives at sub-ambient temperatures is disclosed. The method employs a thin film capacitor having a magnetoelectric element as its dielectric in a GMR read/write head to produce magnetic fields. To get the maximum magnetic field from the thin film capacitor, the thin-film capacitor is cooled via a thermoelectric cooling device present in the GMR read/write head of the magnetic disk drive. The magnetic field produced by the thermoelectrically cooled thin film capacitor structure is capable of writing data onto magnetic media with increased bit densities or coercivity. The effective magnetic moment of the thin film capacitor structure can be increased, as increases in the bit density or coercivity of the magnetic media require, by providing magnetic materials in a structure configured to focus/confine the magnetic field, by increasing the voltage applied to the thin film capacitor structure and by stacking together multiple thin film capacitor structures.

28 Claims, 4 Drawing Sheets

APPARATUS, SYSTEM AND METHOD FOR WRITING INFORMATION ONTO MAGNETIC MEDIA FIELD OF THE INVENTION

FIELD OF THE INVENTION

The present invention relates, in general, to information processing systems and in particular to information storage devices within information processing systems. More particularly, the present invention relates to problems associated with effectively writing information onto the magnetic media used in information storage systems as the bit densities and coercivity of the magnetic media continue to increase.

BACKGROUND OF THE INVENTION

The requirement for high density magnetic storage of data on hard disk drives has been increasing every year. Development of magnetoresistive (MR) sensors (also referred to as heads) for disk drives, in the early 1990's, allowed disk drive products to offer maximum storage capacity with a minimum number of components (heads and disks). Fewer components has translated to lower storage costs, higher reliability and lower power requirements.

In principle, shrinking the data into ever-decreasing areas is the key to providing increased storage within an information storage system. However, it turns out to not be that simple. In order for the read/write system to work reliably, the magnetic fields that the stored data produce must be large enough to generate a measurable electrical signal in the head in read mode, so that the stored information can be retrieved. This means that there is a basic limit to how much you can shrink the area where each byte is to be stored. Try to pack the data into too small an area and you risk not being able to retrieve it. Effectively then, the number of bytes that can be packed onto an information storage system is limited by how sensitive the read/write head is to the magnetic fields produced by those bytes. Additionally, the ability of the read/write head to precisely apply a sufficient magnetic field to such a small area such that the read/write head, in write mode, is capable of flipping the bits therein to write the information is a further consideration of space allocation.

The development of Giant Magnetoresistive (GMR) Heads has promised to revolutionize the design of read/write heads within the next few years. The magnetoresistive materials which make up GMR heads are capable of generating electrical signals which are hundreds of times larger than those generated by conventional magnetic materials when they are put in the same magnetic field. This GMR effect makes materials extremely sensitive to the magnetic fields stored on an information storage system which in turn allows data to be stored in much smaller areas while still making the information easily retrievable.

With the read problem solved by GMR heads, problems still exist in writing information in ever-decreasing areas. Usually, information is written by an inductive recording head where a current is passed through a magnetic core to produce a magnetic field. The generated magnetic field is then applied across a fine air gap between the core and the magnetic media to enable each bit to be appropriately flipped.

As the capacity, or bit density, of the magnetic media is increased, the coercivity of the magnetic media must also be increased. The goal of increasing the coercivity of the magnetic media is to prevent such effects as superparamagnetic limit, media noise, etc. As a result of the increase in coercivity of the magnetic media, the magnetic field required to reverse the magnetization direction of a bit is increased. In order for an inductive recording head to effectively write on the high coercivity media, the inductive recording head must generate a stronger magnetic field. Hence, the current required to write information has to be substantially increased.

The need for such a substantial current has a variety of problems associated with it. First, the high current requirement results in increased power dissipation in the write coils of the inductive recording heads. Second, the eddy current losses in the magnetic core increase due to the larger fields and further due to the trend towards higher frequency operation. Third, the size and complexity of the inductive recording heads, and their associated write coils, necessary to produce the required magnetic fields are substantial barriers to their standardization.

Therefore, it is desirable to provide a method for writing information on high bit density, and therefore high coercivity, magnetic media which will not experience the problems of increased power dissipation, eddy current losses, or the size and complexity issues present in current inductive recording head technology. Solving the problems presented by current technology will allow further advances in data storage technology including greater capacity, faster read and write times, continued miniaturization of components, lower power needs as well as many other benefits.

SUMMARY OF THE INVENTION

The present invention overcomes the limitations of presently used read/write heads by creating a magnetic field about a capacitive element capable of being focused and strengthened such that information can be effectively written onto high bit density hard disk drives.

In one form, the invention relates to a read/write apparatus for reading/writing information on a magnetic medium comprising a capacitive element capable of generating a magnetic field for writing information onto a magnetic medium and a cooling apparatus, operably associated with the capacitive element, capable of cooling the capacitive element to a sub-ambient temperature.

In another form, the invention relates to a method for writing information on a magnetic medium comprising creating a magnetic field, about a capacitive element, capable of writing information on a magnetic medium and cooling the capacitive element to a sub-ambient temperature.

In yet another form, the invention relates to an information storage system comprising a magnetic medium, a read/write apparatus operably associated with the magnetic medium for reading/writing information on said magnetic medium comprising a capacitive element capable of generating a magnetic field for writing information onto the magnetic medium and a cooling apparatus, operably associated with the capacitive element, capable of cooling the capacitive element to a sub-ambient temperature.

In a particularized form, the present invention writes information onto magnetic media by employing a thin-film capacitor structure coupled to a voltage source. The thin-film capacitor has a few nanometer thick dielectric made of a magnetoelectric material such as $Cr_2O_3$. In order for the thin-film capacitor structure to perform optimally, the thin-film capacitor structure is cooled to a temperature of 255 K. As voltage is applied to the thin-film capacitor having a magnetoelectric material dielectric, a magnetic field is produced which is then applied to a magnetic media enabling the writing of data thereon.

These and other features of the invention will be more clearly understood and appreciated upon considering the detailed embodiments described hereinafter.

BRIEF DESCRIPTION OF DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures.

DETAILED DESCRIPTION OF A PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
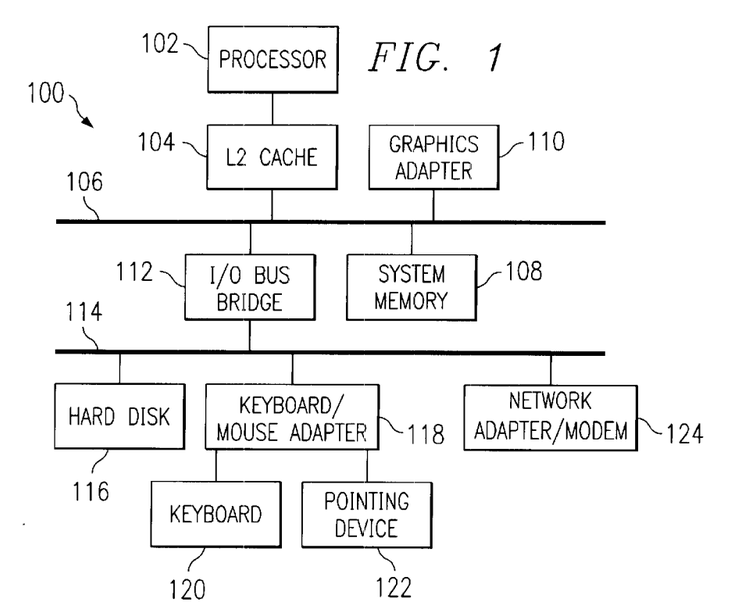
FIG. 1 depicts a high-level block diagram of an information processing system in which a preferred embodiment of the present invention may be implemented.

With reference now to the figures, and in particular with reference to FIG. 1, a high-level block diagram of an information processing system in which a preferred embodiment of the present invention may be implemented, is depicted. Information processing system 100, in the exemplary embodiment, includes a processor 102, which may be a Power PC processor available from International Business Machines Corporation of Armonk, N.Y. Processor 102 is connected to a level (L2) cache 104, which is utilized to stage data to and from processor 102 at reduced access latency. L2 cache 104 is connected in turn to an interconnect or system bus 106, which is also connected, in the embodiment depicted, to system memory 108 and memory mapped graphics adapter 110. Graphics adapter 110 provides a connection for a display device (not illustrated) on which the user interface of software executed within information processing system 100 is displayed.

Also connected to system bus 106 in the exemplary embodiment is input-output (I/O) bus bridge 112, which provides an interface between system bus 106 and I/O bus 114. A nonvolatile memory such as hard disk drive 116 may be connected to I/O bus 114, as may keyboard/mouse adapter 118, which provides connection to I/O bus 114 for keyboard 120 and pointing device 122. Pointing device 122 may be a mouse, trackball, or the like. Also connected to I/O bus 114 may be network adapter 124 for connecting information processing system 100 to a local area network (LAN), the Internet, or both. Those skilled in the art will appreciate that other devices may be incorporated into information processing system 100, such as an optical disk drive or a modem.

Program information comprising instructions and/or data is stored on nonvolatile memory 116 and may be selectively copied into system memory 108 once information processing system 100 is powered on. Processor 102 executes the instructions within such program information and generates text or graphical information for presentation on a display device connected via graphics adapter 110, where the information may be viewed by a user. The user may selectively control operation of information processing system 100 through input entered on keyboard 120 or through pointing device 122.

Figure 2:
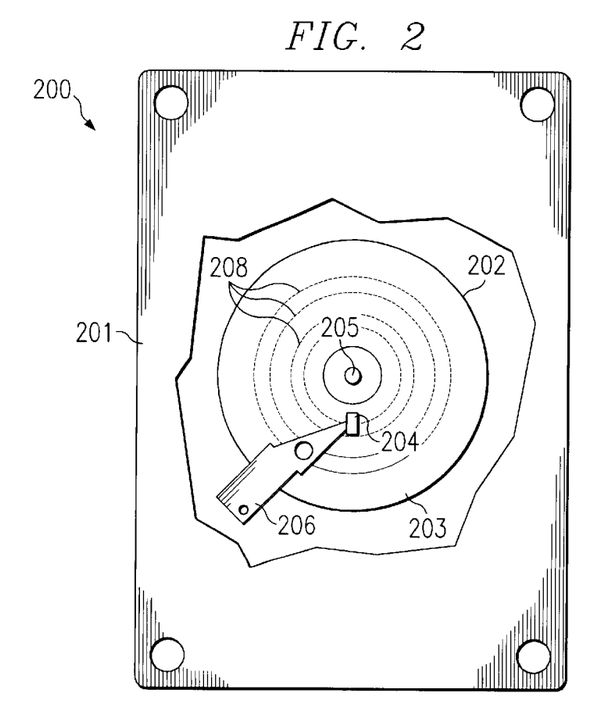
FIG. 2 is a cut-away, top plan view of an information storage system in accordance with a preferred embodiment of the present invention.

Referring now to FIG. 2, a cut-away, top plan view of an information storage system in accordance with a preferred embodiment of the present invention, is illustrated. Information storage system 200, includes a housing 202 containing at least one rotatable information storage disk 202 supported on a spindle 205 and rotated by a drive motor (not shown). Typically, an information storage system will comprise a plurality of disks and a slider 206 with a read/write head 204 for each disk. As an example, in a magnetic disk storage device, each information storage disk 202 has the capability of receiving and retaining information, through the use of a magnetic recording medium formed on at least one disk surface 203, where the magnetic recording medium is arranged in an annular pattern of multiple concentric data tracks 208. Though only a few information tracks 208 are shown, the number of tracks varies according to at least the recording medium and the read/write head 204. At least one slider 206, including one or more read/write heads 204 is positioned over information storage disk 202. Slider 206 is suspended from an actuator arm (not shown) by a suspension (also not shown) and the radial position of slider 206 with respect to information tracks 208 of information storage disk 202, is controlled by a voice coil motor (not shown).

During operation of information storage system 200, the rotation of information storage disk 202 generates an air bearing between slider 206 and disk surface 203. The air bearing counterbalances a slight downward-biased spring force of the suspension and supports slider 206 above disk surface 203 by a small, substantially constant spacing. As disk 202 is rotated by the drive motor, slider 206 is moved radially in and out in response to the movement of the actuator arm by the voice coil motor, permitting read/write head 204 to read and write information from and to the concentric tracks 208. Though only one read/write head 204 and slider 206 assembly is shown, a plurality of sliders 206 may be employed to access a plurality of disks 202, stacked one atop the other on spindle 205.

The temperature of read/write head 204 may rise during operation of information storage drive 200 due to previously discussed magnetic field changes and ambient conditions in information storage system 200. During operation, read/write head 204, passes through magnetic field changes induced by stored information in the magnetic medium of disk 202. Temperature increases in read/write head 204 may be caused by the magnetic field changes encountered, along with the sensing current, while passing over the surface of disk 202. As read/write head 204 passes over magnetically encoded information in the form of bits, the activation currrents in write coils and bias currents in sensors generates heat within read/write head 204. Magnetic instability may arise in read/write head 204 due to increasing read/write head 204 temperature. Magnetic instability causes noise and, concurrently, distortions in a current flow pattern in an active region (area (not shown) between bias field conductors of read/write head 204). A TEC device, may be mounted in close proximity to read/write head 204 to provide an active heat transfer device. Also, the TEC device may utilize a separate power source or in very low temperature conditions, the same power source as the read/write head.

TEC devices are used to cool many heat producing components such as; blood analyzers, lasers, microprocessors, etc. TECs may be coupled in series and parallel to increase heat extraction efficiency and dramatically decrease the temperature of a heat source.

Figure 3:
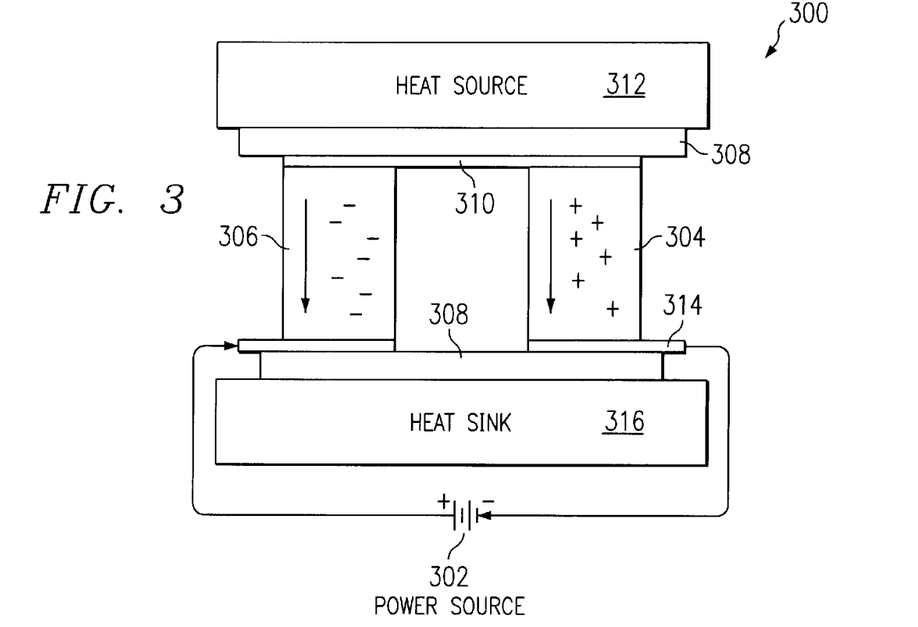
FIG. 3 depicts a high-level block diagram of a thermoelectric cooling device.

Referring to FIG. 3, a high-level block diagram of a Thermoelectric Cooling (TEC) device is depicted. Thermoelectric cooling is based on the Peltier Effect, by which DC current from power source 302 is applied across two dissimilar materials and causes a temperature differential. A typical thermoelectric cooling device utilized p-type semiconductor 304 and n-type semiconductor 306 sandwiched between poor electrical conductors 308 that have good heat conducting properties. N-type semiconductor 306 has an excess of electrons, while p-type semiconductor 304 has a deficit of electrons.

As electrons move from p-type semiconductor 304 to n-type semiconductor 306 via electrical conductor 310, the energy state of the electrons is raised due to heat energy absorbed from heat source 312. This process has the effect of transferring heat energy from heat source 312 via-electron flow through p-type semiconductor 304 and electrical conductor 314 to heat sink 316 where the electrons drop to a lower energy state and release the heat energy. More specifically, electrons from conductor 308 heated by heat source 312 are driven into n-type semiconductor 306 and the remaining electrons become cold. The same occurs for hole transport across p-type semiconductor 304.

Figure 4:
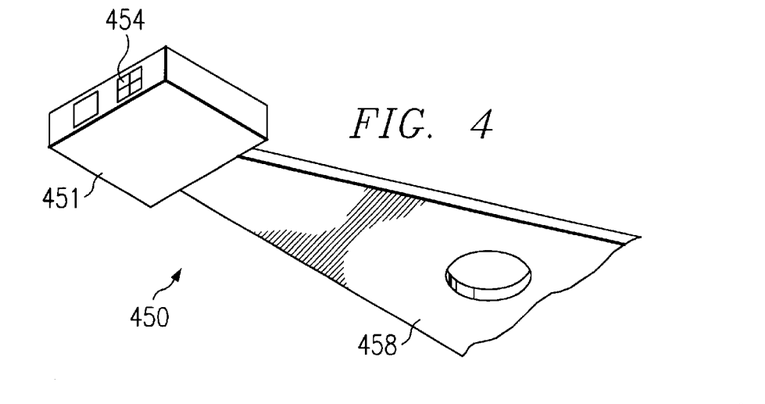
FIG. 4 depicts a high-level block diagram of a GMR head utilizing a thermoelectric cooling device and a capacitive magnetoelectric write head in accordance with a preferred embodiment of the present invention.
Figure 4A:
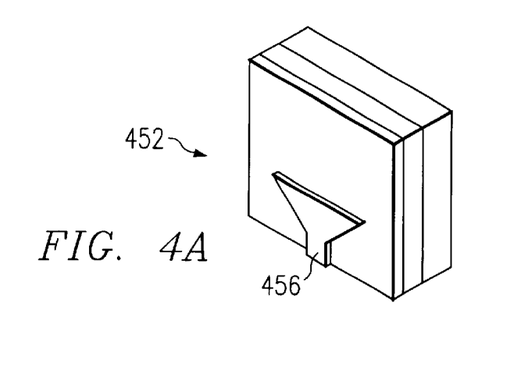

Referring now to FIG. 4, an embodiment of a read/write head with a thermoelectric cooling device in close proximity to the GMR head chip, in accordance with a preferred embodiment of the present invention, is illustrated. Suspended slider arm 450 includes arm 458 and GMR head 451. Not shown are the sensor conductors which lead from the GMR head chip 452 and conductors for supplying power to the thermoelectric cooling device 454. Thermoelectric cooling device 454 is enclosed in GMR head 451 in close proximity to GMR head chip 452. GMR head chip includes capacitive write head 456, the function and configuration of which, will be described below. GMR head chip 452 and thermoelectric cooling device 454 are thermally connected by a heat transfer medium with very high thermal conductivity. Power, either from a separate power source or the same power source as the read/write head, is applied to thermoelectric cooling device 454 in a manner sufficient to cause thermoelectric cooling device 454 to exhibit a cold end and a hot end. Heat is transferred from GMR head chip 452, and therefore capacitive write head 456, to the cold end of thermoelectric cooling device 454 which in turn, transfers from the hot end of thermoelectric cooling device 454 along arm 451 by heat pipes (not shown) or cooling fins (not shown). For more information regarding the method of cooling GMR heads, refer to co-pending U.S. patent application Ser. No. 09/282,272, filed Mar. 31, 1999 entitled "METHOD AND APPARATUS FOR COOLING GMR HEADS FOR MAGNETIC HARD DISKS," herein incorporated by reference.

Figures 5, 6:
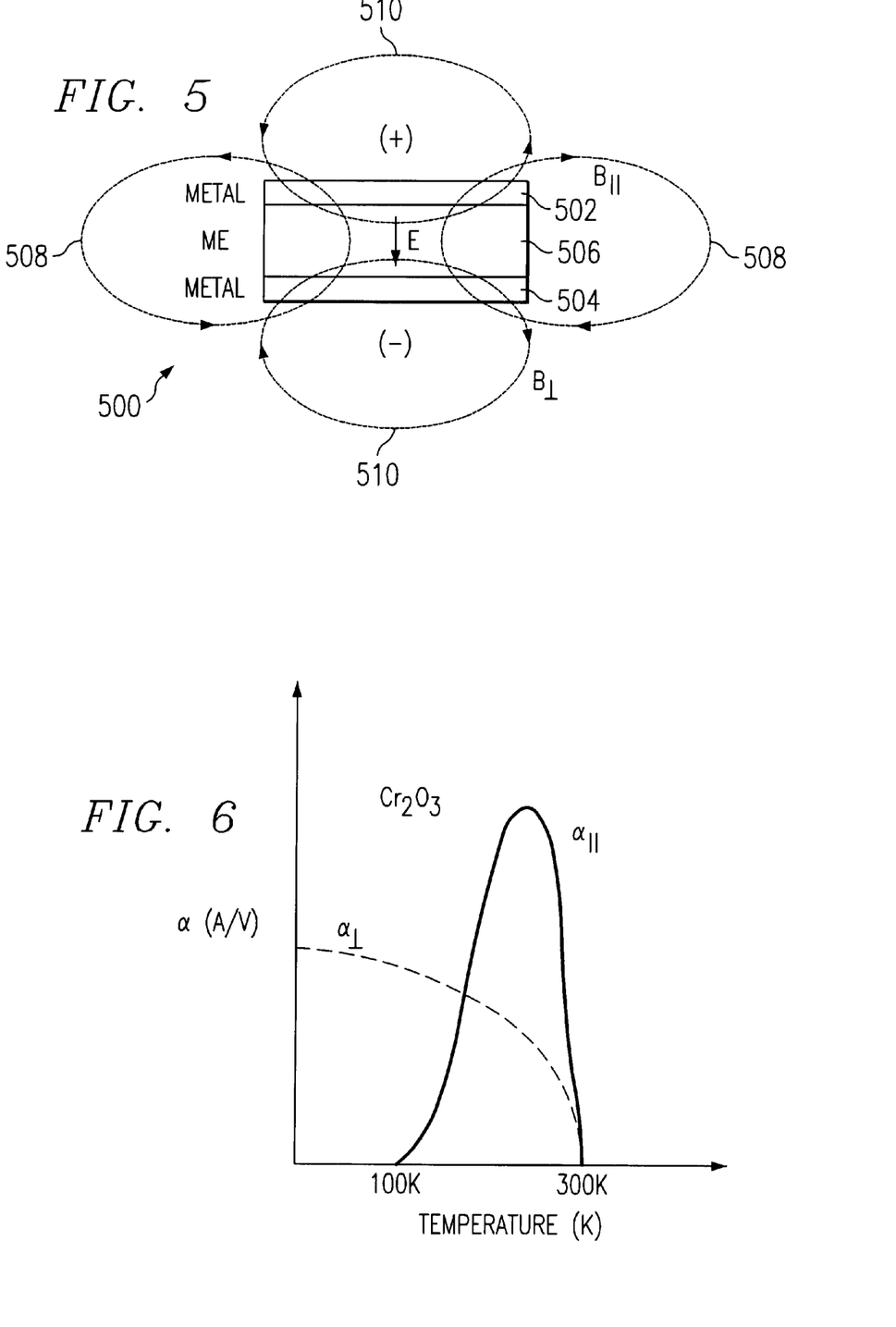
FIG. 5 illustrates a high level block diagram of a capacitive element employed in a write head according to one embodiment of the present invention.
FIG. 6, illustrates a graph of the magnetic susceptibility gains achieved by cooling the capacitive element of a read/write head according to a preferred embodiment of the present invention.

Referring now to FIG. 5, a high level block diagram of a capacitive element configured to be employed in a read/write head similar to capacitive write head 456 of FIG. 4, in accordance with an embodiment of the present invention, is illustrated. Capacitive element 500 is designed to replace the inductive write heads and write coils utilized by present day GMR read/write heads. Instead of producing a magnetic field for writing information via current and an inductive element, capacitive element 500 utilizes the magnetoelectric effect found in certain compounds or materials in conjunction with an applied voltage to create the magnetic fields needed to write information onto magnetic media. By replacing current through an inductive coil with voltage across a capacitor at the write head, power dissipation at the head is minimized thereby minimizing the temperature of the head.

As illustrated, capacitive element 500 is comprised of first layer 502 and second layer 504. Magnetoelectric material 506 is employed as the dielectric of capacitive element 500 between first layer 502 and second layer 504. Capacitive element 500 employs magnetoelectric material 506 as its dielectric to obtain the magnetoelectric effect it produces when an electric field, or a voltage, is applied. The magnetoelectric effect provided by magnetoelectric material 506 enables capacitive element 500 to produce magnetic fields 508 and 510 capable of effectively writing information onto magnetic media.

In a preferred embodiment of the present invention, capacitive element 500 utilizes thin film materials as first layer 502 and second layer 504 to create a thin film capacitor. A magnetoelectric material is used for the dielectric of the thin film capacitor. In one embodiment of the present invention, the magnetoelectric material 506 is $Cr_2O_3$. Other materials, such as $GaFeO_3$, are also anticipated by the present invention. The magnetoelectric effect produced by magnetoelectric material 506 is characterized by a magnetic susceptibility a that is both temperature dependent and direction dependent. Magnetic susceptibility is defined as the ratio of magnetization to magnetic intensity. By effectively cooling capacitive element 500, via thermoelectric cooling device 454, the magnetic field produced can be maximized.

Referring now to FIG. 6, a graph of the magnetic susceptibility gain possible from cooling capacitive element 500 to a sub-ambient temperature is illustrated. In FIG. 6, magnetic susceptibility is plotted against temperature. The improvements plotted are for the magnetoelectric material $Cr_2O_3$. As illustrated, the maximum $\alpha_\parallel$ achieved using $Cr_2O_3$ is about $12\times10^4$ A/V, where $\alpha_\parallel=B_\parallel/E\mu_0$. This maximum occurs at a temperature of 255 K. Cooling the capacitive element 500 to 255 K can be achieved with a $Bi_2Te_3$, or a similar thermoelectric cooling apparatus. A thin film capacitor structure with a dielectric of $Cr_2O_3$ approximately 5 nanometers thick and an electric field of $4\times10^8$ V/m (i.e., 2 Volts) produces a magnetic field of about $4.8\times10^5$ A/m or 0.6 T in air. The magnitude of this magnetic field is sufficient to write information on a magnetic media. By increasing the voltage across the capacitor or by connecting a plurality of capacitors in series, the effective magnetic moment can be increased. The effective magnetic moment can also be increased by focusing or confining the magnetic field through the use of magnetic field shielding apparatuses made from magnetic materials having a magnetic susceptibility a that is both temperature-dependent and direction dependent. For further information see (R. M. Hornreich, "The Magnetoelectric Effect: Materials, Physical Aspects, and Applications," IEEE Trans. Magnetics, vol. MAG-8, no. 5, pp. 584–589, September 1972) which is hereby incorporated by reference.

Figure 7A:
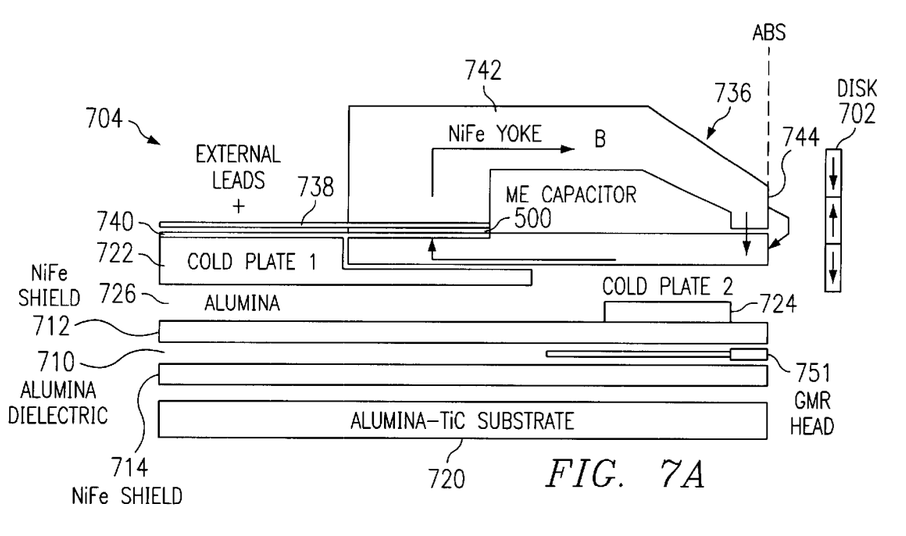
FIGS. 7A and 7B, depict a detailed side and top view, respectively, of a read/write head utilizing a thermoelectric cooling device and a capacitive write head in accordance with a preferred embodiment of the present invention.
Figure 7B:
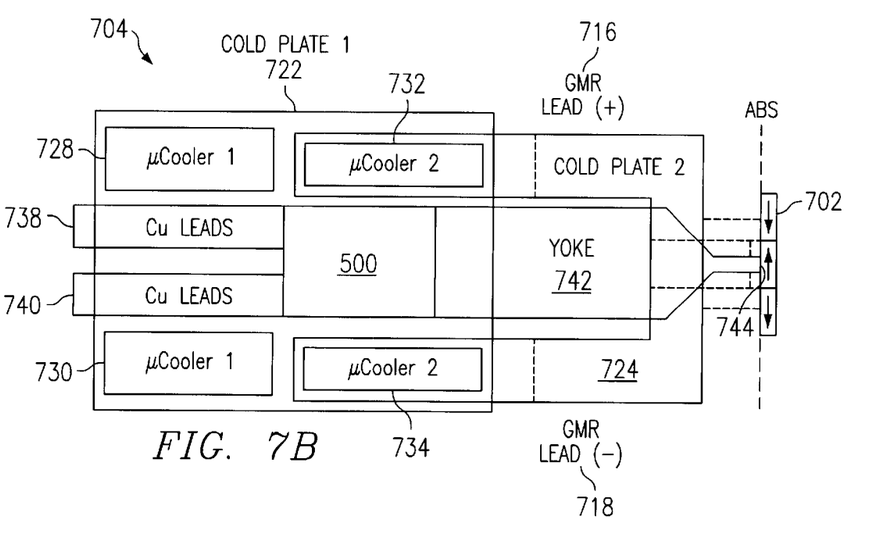

Referring now to FIGS. 7A and 7B, a detailed side and top view, respectively, of a read/write head utilizing a thermoelectric cooling device and a capacitive magnetoelectric write head in accordance with a preferred embodiment of the present invention is shown. Reference numerals in FIGS. 7A and 7B which are identical, like or similar to reference numerals in FIGS. 2, 4 and 5 indicate identical, like or similar components. Read/write head 704 is shown in close proximity to information storage disk 702. Read/write head 704 includes GMR head 751 for reading information from disk 702. GMR head 751 is disposed in an Alumina dielectric layer 710 shielded by NiFe shields 712, 714. GMR leads 716, 718 are electrically coupled to GMR head 751 for operation. GMR head 751, dielectric layer 710 and shields 712, 714 are positioned on top of an alumina-TiC substrate 720. A first cold plate 722 and a second cold plate 724 are separated by an electrically and thermally insulating sputtered alumina layer 726. Read/write head 704 further includes first thermoelectric microcoolers 728, 730 associated with first cold plate 722 and second thermoelectric microcoolers 732, 734 associated with second cold plate 724. Read/write head 704 further comprises magnetoelectric write head 736 for writing information to disk 702 electrically coupled to copper leads 738, 740 for operation. Magnetoelectric write head 736 includes magnetoelectric capacitor 500 coupled to leads 738, 740 and to a NiFe yoke 742 for transferring magnetic flux to disk 702. In this manner, low temperature regions on first cold plate 722 are located away from air bearing surface (ABS) 744 on yoke 742 to avoid condensation problems magnetoelectric capacitor 500 may be operated at approximately 255 K using microcoolers 728, 730 where the magnetoelectric susceptibilities are high and GMR head 751 may be operated at 200 K using microcoolers 732, 734.

Although an embodiment of the present invention has been shown and described in detail herein, along with certain variants thereof, many other varied embodiments that incorporate the teachings of the invention may be constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A read/write apparatus for reading/writing information on a magnetic medium comprising:
    a capacitive element capable of generating a magnetic field for writing information onto a magnetic medium; and
    a cooling apparatus, operably associated with said capacitive element, capable of cooling said capacitive element to a sub-ambient temperature.

2. The apparatus, as claimed in claim 1, wherein said cooling apparatus includes at least one thermoelectric cooler.

3. The apparatus, as claimed in claim 1, further comprising:
    a shielding apparatus operably associated with said capacitive element and capable of focusing said magnetic field.

4. The apparatus, as claimed in claim 1, wherein said capacitive element is a thin film capacitor.

5. The apparatus, as claimed in claim 1, wherein said capacitive element includes a plurality of thin film capacitors.

6. The apparatus, as claimed in claim 1, wherein said capacitive element further comprises a dielectric approximately five nanometers thick.

7. The apparatus, as claimed in claim 1, wherein said capacitive element further comprises a dielectric made of $Cr_2O_3$.

8. The apparatus, as claimed in claim 1, wherein said capacitive element further comprises a dielectric made of $GaFeO_3$.

9. The apparatus, as claimed in claim 1, wherein said magnetic medium is comprised of a thin film media.

10. A method for writing information on a magnetic medium comprising:
    creating a magnetic field, about a capacitive element, capable of writing information on a magnetic medium; and
    cooling said capacitive element to a sub-ambient temperature.

11. The method, as claimed in claim 10, further comprising:
    applying said magnetic field to said magnetic medium such that information is written on said magnetic medium.

12. The method, as claimed in claim 10, wherein said step of creating further comprises applying a voltage to said capacitive element.

13. The method, as claimed in claim 10, further comprising focusing said magnetic field.

14. The method, as claimed in claim 10, wherein said step of creating further includes creating a magnetic field about a plurality of capacitive elements.

15. The method, as claimed in claim 10, wherein said capacitive element is comprised of at least one thin film capacitor.

16. An information storage system comprising:
    a magnetic medium; and
    a read/write apparatus operably associated with said magnetic medium for reading/writing information on said magnetic medium comprising:
        a capacitive element capable of generating a magnetic field for writing information onto said magnetic medium; and
        a cooling apparatus, operably associated with said capacitive element, capable of cooling said capacitive element to a sub-ambient temperature.

17. The information storage system, as claimed in claim 16, wherein said cooling apparatus includes at least one thermoelectric cooler.

18. The information storage system, as claimed in claim 16, further comprising:
a shielding apparatus operably associated with said capacitive element and capable of focusing said magnetic field.

19. The information storage system, as claimed in claim 16, wherein said capacitive element is a thin film capacitor.

20. The information storage system, as claimed in claim 16, wherein said capacitive element includes a plurality of thin film capacitors.

21. The information storage system, as claimed in claim 16, wherein said capacitive element further comprises a dielectric approximately five nanometers thick.

22. The information storage system, as claimed in claim 16, wherein said capacitive element further comprises a dielectric made of $Cr_2O_3$.

23. The information storage system, as claimed in claim 16, wherein said capacitive element further comprises a dielectric made of $GaFeO_3$.

24. The information storage system, as claimed in claim 16, wherein said magnetic medium is comprised of a thin film media.

25. The information storage system, as claimed in claim 16, further comprising:
an information processing system operably associated with said information storage system.

26. A read/write apparatus for reading/writing information on a magnetic medium comprising:
a capacitive element capable of generating a magnetic field for writing information onto a magnetic medium by utilizing magnetoelectric effects; and
a cooling apparatus, operably associated with said capacitive element, capable of cooling said capacitive element to a sub-ambient temperature.

27. A method for writing information on a magnetic medium comprising:
creating a magnetic field, about a capacitive element, capable of writing information on a magnetic medium by utilizing magnetoelectric effects; and
cooling said capacitive element to a sub-ambient temperature.

28. An information storage system comprising:
a magnetic medium; and
a read/write apparatus operably associated with said magnetic medium for reading/writing information on said magnetic medium comprising:
a capacitive element capable of generating a magnetic field for writing information onto said magnetic medium by utilizing magnetoelectric effects; and
a cooling apparatus, operably associated with said capacitive element, capable of cooling said capacitive element to a sub-ambient temperature.

* * * * *

UNITED STATES PATENT AND TRADEMARK OFFICE
CERTIFICATE OF CORRECTION

PATENT NO. : 6,535,342 B1
DATED : March 18, 2003
INVENTOR(S) : Ghoshal

It is certified that error appears in the above-identified patent and that said Letters Patent is hereby corrected as shown below:

<u>Title page, Item [54] and Column 1, line 3,</u>
After "MEDIA", delete "FIELD OF THE INVENTION".

Signed and Sealed this

Thirtieth Day of September, 2003

JAMES E. ROGAN
*Director of the United States Patent and Trademark Office*